United States Patent
Modave et al.

(10) Patent No.: US 10,970,384 B2
(45) Date of Patent: Apr. 6, 2021

(54) AUTHENTICATION OF AN ELECTRONIC CIRCUIT

(71) Applicant: Proton World International N.V., Diegem (BE)

(72) Inventors: Jean-Louis Modave, Ottignies (BE); Michael Peeters, Tourinnes-la-Grosse (BE)

(73) Assignee: Proton World International N.V., Diegem (BE)

( * ) Notice: Subject to any disclaimer, the term of this patent is extended or adjusted under 35 U.S.C. 154(b) by 175 days.

(21) Appl. No.: 16/400,495

(22) Filed: May 1, 2019

(65) Prior Publication Data

US 2019/0340351 A1 Nov. 7, 2019

(30) Foreign Application Priority Data

May 3, 2018 (FR) ....................................... 1853818

(51) Int. Cl.
*G06F 21/44* (2013.01)
*H04L 9/08* (2006.01)

(52) U.S. Cl.
CPC ............ *G06F 21/44* (2013.01); *H04L 9/0869* (2013.01); *H04L 9/0894* (2013.01)

(58) Field of Classification Search
None
See application file for complete search history.

(56) References Cited

U.S. PATENT DOCUMENTS

| 6,993,666 | B1* | 1/2006 | Hokkanen | G06F 21/34 713/155 |
|---|---|---|---|---|
| 8,428,254 | B2* | 4/2013 | Potkonjak | H04L 9/0838 380/44 |
| 8,549,314 | B2* | 10/2013 | Mahmoud Abd Alla | G06F 21/31 713/183 |
| 9,770,915 | B1* | 9/2017 | Ness | H04N 1/4433 |
| 9,851,914 | B2 | 12/2017 | Rodriguez et al. | |
| 10,033,724 | B2* | 7/2018 | Donohue | H04L 63/105 |
| 10,218,500 | B2* | 2/2019 | Cuypers | H04L 9/0637 |
| 10,237,071 | B2* | 3/2019 | Cuypers | G06Q 20/409 |
| 2003/0110381 | A1* | 6/2003 | Aoshima | H04L 63/0838 713/168 |
| 2003/0177385 | A1* | 9/2003 | Price | H04L 63/08 713/171 |

(Continued)

OTHER PUBLICATIONS

INPI Search Report and Written Opinion for FR 1853818 dated Nov. 30, 2018 (10 pages).

*Primary Examiner* — Piotr Poltorak
(74) *Attorney, Agent, or Firm* — Crowe & Dunlevy

(57) ABSTRACT

In authenticating a first circuit by a second circuit, the second circuit selects one of a set of public values and sends to the first circuit a request for a secret value corresponding to the selected one of the set of public values. The first circuit derives the secret value from the selected one of the set of public values using a seed from set of seeds that is stored in a destructive fashion such that each use of a seed destroys that seed. The set of seeds is smaller in number than the set of public values. The second circuit determines whether the secret value matches the selected one of the set of public values using a one-way function. A positive authentication is generated based upon the determination of a match.

17 Claims, 2 Drawing Sheets

(56) References Cited

U.S. PATENT DOCUMENTS

| | | | |
|---|---|---|---|
| 2007/0118736 A1* | 5/2007 | Huque | G06Q 20/3552 713/155 |
| 2007/0118753 A1* | 5/2007 | Huque | G06Q 20/341 713/176 |
| 2008/0172230 A1* | 7/2008 | Hayakawa | G10L 17/14 704/249 |
| 2008/0172713 A1* | 7/2008 | Kamendje | H04L 43/065 726/1 |
| 2011/0296509 A1* | 12/2011 | Todorov | H04L 9/3271 726/7 |
| 2013/0212385 A1* | 8/2013 | Schechter | H04L 9/0877 713/168 |
| 2015/0089630 A1 | 3/2015 | Lee | |
| 2015/0134942 A1* | 5/2015 | Novak | G06F 21/72 713/2 |

* cited by examiner

AUTHENTICATION OF AN ELECTRONIC CIRCUIT

PRIORITY CLAIM

This application claims the priority benefit of French Application for Patent No. 1853818, filed on May 3, 2018, the content of which is hereby incorporated by reference in its entirety to the maximum extent allowable by law.

TECHNICAL FIELD

The present disclosure generally relates to electronic circuits and systems, and more particularly to a mechanism for authentication of an electronic circuit by another electronic circuit. The present disclosure even more particularly applies to a verification of the authenticity of a product associated with a device by circuits respectively contained in the product and in the device.

BACKGROUND

The presence of non-authentic products, in particular of consumables or accessories for devices is an issue for the device manufacturer and for the authorized suppliers of the authentic products (consumables or accessories), particularly in the case of returns due to functional problems. It is important to be able to distinguish authentic products from non-authentic products.

Authentication processes have the function of verifying that the product paired with the device is effectively authentic or authorized. For this purpose, the devices and the associated products are equipped with electronic circuits executing authenticity verification protocols when a new product is installed, at the powering on of the device, periodically, when the product needs being replaced, etc.

More generally, in many applications, during a data exchange between two electronic circuits, for example, two microcontrollers, two computers, or two devices communicating in wired or wireless fashion, directly or via a wired or wireless network, it is desired to ascertain the authenticity of the circuits communicating with each other.

SUMMARY

An embodiment overcomes all or part of the disadvantages of processes of authentication between two electronic circuits.

An embodiment provides an authentication process compatible with various natures of devices and of products.

An embodiment provides a solution particularly adapted to an application where the verifier circuit and the circuit to be verified are identified on manufacturing.

Thus, an embodiment provides a method of authentication of a first electronic circuit by a second electronic circuit, wherein the first circuit generates a first value, based on a second value received from the second circuit and on a third value contained in a first destructive readout non-volatile memory.

According to an embodiment, the second circuit generates the first value using a derivation function.

According to an embodiment, the first circuit communicates the first value to the second circuit.

According to an embodiment, the first circuit stores the first value in a non-volatile fashion.

According to an embodiment, the second circuit applies a one-way function to the first value.

According to an embodiment, the one-way function supplies, in the case of a successful authentication, the second value.

According to an embodiment, the second circuit selects the second value from a predefined set.

According to an embodiment, each third value enables generation of, in one-way fashion, as many first values as the set contains second values, the first and second values being linked by an associative function.

According to an embodiment, the first circuit contains, in the first memory, a number of third values smaller than the number of values contained in the assembly.

According to an embodiment, the first circuit contains, in a second memory, the set of second values.

According to an embodiment, the first circuit communicates the set to the second circuit which selects, from this set, the second value.

An embodiment provides an authentication circuit having a first destructive readout non-volatile memory, at least one output intended to supply a first value, and at least one input intended to receive a second value from a second circuit. The first value is a function of the second value and of a third value contained in the first destructive readout non-volatile memory.

According to an embodiment, the circuit is configured to implement the described authentication method.

An embodiment provides a system of authentication of a first circuit by a second circuit, wherein the first circuit includes a destructive readout non-volatile memory.

An embodiment provides a system of authentication of a product by a device, wherein the product includes a first circuit, the device including a second circuit such as described.

BRIEF DESCRIPTION OF THE DRAWINGS

The foregoing and other features and advantages will be discussed in detail in the following non-limiting description of specific embodiments in connection with the accompanying drawings, wherein.

DETAILED DESCRIPTION

Figure 1:
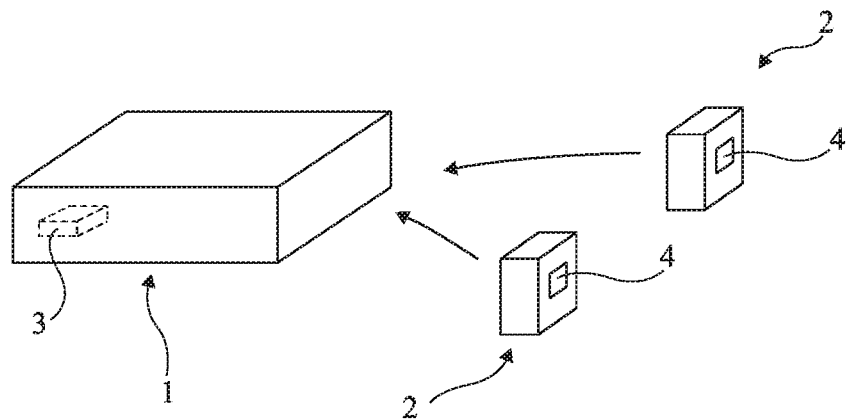
FIG. 1 schematically shows, in the form of blocks, an example of a device-product system of the type to which the described embodiments apply.

The same elements have been designated with the same reference numerals in the different drawings. In particular, the structural and/or functional elements common to the different embodiments may be designated with the same reference numerals and may have identical structural, dimensional, and material properties.

For clarity, only those steps and elements which are useful to the understanding of the embodiments which will be described have been shown and will be detailed. In particular, the possible mechanisms of exchange of ciphered or non-ciphered data between the electronic circuits have not been detailed, the described embodiments being compatible with usual mechanisms known to those of skill in the art.

Throughout the present disclosure, the term "connected" is used to designate a direct electrical connection between circuit elements, whereas the term "coupled" is used to designate an electrical connection between circuit elements that may be direct, or may be via one or more intermediate elements. Unless indicated otherwise, when the term "coupled" is used, the connection can be implemented by a direct connection.

The terms "approximately", "about", and "in the order of" are used herein to designate a tolerance of plus or minus 10%, preferably of plus or minus 5%, of the value in question.

Reference will be made hereafter to an example of application where the device-product system concerns mobile phones (devices) and their batteries (products). However, all that is described applies to any device-product system for which similar issues arise and, more generally, to any authentication of an electronic circuit by another one respecting the described functionalities. Further, it is assumed for simplification that the authentication is performed by the device which authenticates one or a plurality of products that it contains, but all that is described transposes to an inverse operation, that is, to an authentication of the device (for example, a web access peripheral) by a product (web connection) to which the device is associated.

FIG. 1 schematically shows in the form of blocks an example of a device-product system of the type to which the described embodiments apply as an example.

It is assumed that the device is a phone 1 and that the products are batteries 2 for this phone.

To verify the authenticity of the batteries, a mechanism of authentication of battery or batteries 2 by phone 1, or even of the phone by the battery or batteries, is implemented. To achieve this, phones 1 and batteries 2 are equipped with electronic circuits, respectively 3 and 4, capable of exchanging data to implement an authentication process. The communication may be wired or wireless, for example, by near field communication (NFC).

Electronic circuits 3 and 4 may have other functions such as, for example, measuring the charge level of the battery, and the communication can thus also involve processes other than authentication. According to the applications, the authentication may be performed, on installation of the battery, at each powering-on of the phone, before each connection to the network, periodically, etc.

For simplification, reference will be made hereafter to a verifier circuit and to a candidate circuit. However, the device-product systems targeted by the present description comprise a plurality of devices and a plurality of products, and thus a plurality of similar verifier circuits and a plurality of similar candidate circuits.

Figure 2:
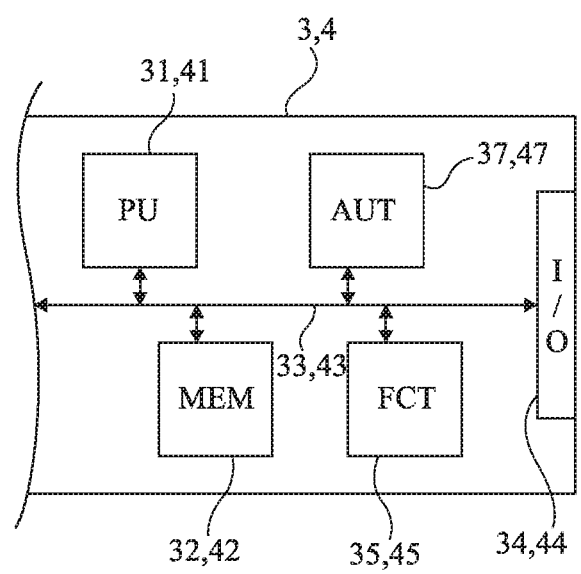
FIG. 2 schematically shows, in the form of blocks, an embodiment of an electronic circuit of the type to which the described embodiments apply.

FIG. 2 schematically shows, in the form of blocks, an embodiment of an electronic circuit 3 or 4 of the type to which the described embodiments apply. This circuit may be located on the side of the verifier circuit and on the side of the candidate circuit (circuit to be verified).

Circuit 3 (or 4) includes: one or a plurality of processing units 31 (or 41) (PU), for example, a state machine, a microprocessor, a programmable logic circuit, etc; one or a plurality of volatile and/or non-volatile storage areas 32 (or 42) (MEM) for storing all or part of the data and programs; one or a plurality of data, address, and/or control buses 33 (or 43) between the different elements internal to circuit 3 (or 4); one or a plurality of input/output interfaces 34 (or 44) (I/O) of wired or wireless communication with the outside of the corresponding circuit 3 (or 4); and various other circuits according to the application, symbolized in FIG. 2 by a block 35 (or 45) (FCT).

According to the shown embodiment, circuit 3 (or 4) further comprises an authentication circuit or function 37 (or 47) (AUT) implementing a method of authentication of one of circuit 3 or 4 by the other of circuit 3 or 4, for example, of a circuit associated with a battery by a circuit associated with a phone.

Blocks 37 and 47 are, for example, dedicated processors independently executing the authentication program or contain the program and the data used for an execution by unit 31 or 41.

To attempt to fool authenticity mechanisms, two categories of candidate circuits capable of replicating an alternative authentication mechanism can be encountered.

A first category comprises clone circuits, that is, circuits totally identical to an authentic circuit. Such circuits are generally obtained by copying the general topography (design) of an authentic circuit, so that the circuit operates in the same way.

A second category of non-authentic circuits, which are more current because they are easier to form, comprises emulating the operation of an authentic circuit by implementing an adapted program with a standard microprocessor. Even though this requires discovering the secret of the authentication mechanism by cryptographic attacks of side channel or reverse engineering type, it remains simpler and often more accessible than cloning the circuit (its topography).

Most often, a mixture of both techniques is used, that is, even when forming a clone circuit, certain data stored at the end of the manufacturing, such as authentication keys, code lists, etc., are pirated by fault injection attacks in authentic circuits to integrate them in the clone circuits.

An authentication mechanism according to which certain data are supplied to verifier circuit 3 at the end of the manufacturing, for example, in a customization phase, and other data are supplied to circuit 4 to be verified (candidate circuit), is provided. Preferably, such data are different, that is, the data owned by verifier circuit 3 are not contained in the circuit to be verified 4 and conversely.

A non-volatile memory erasable on reading, that is, where the data contained in the memory, which are stored therein during the circuit customization, is only readable once, is also provided on the side of candidate circuit 4. Such a function may be implemented in a non-volatile reprogrammable memory, that is, a step of erasing after the reading of the readout data may be included in the authentication algorithm. However, it is preferred to use a specific memory having this intrinsic characteristic in its controller to avoid for the erasing after read to be prevented by a fault injection attack. Such a "once-only read" or destructive readout memory (destructive for the read data) is, for example, included in block 47.

Duplications of the candidate circuits are desired to be avoided. Indeed, taking again the example of the application to telephones and to batteries, what mostly matters is to avoid for a new generation of batteries to be cloned, be it by a duplication of the circuit or by an attack to emulate the operation of the circuit that it contains.

Thus, a specificity of the described authentication mechanism is that it is not attempted to prevent a fault injection or side channel attack, nor to block the candidate circuit in the case of an attack, but rather make it so that such attacks are not enabled to form a functional clone circuit.

According to the described embodiments, the authentication mechanism exploits a list of so-called public values and a list of so-called secret values. The two lists have the same size (contain a same number of values, preferably different from one another) to associate one and only one secret value to each public value. "Public" means that all the public values are likely to be known by both circuits (verifier and candidate circuit) and stored or calculated by the two circuits. "Secret" means that the set of secret values is only capable of being calculated by the candidate circuit.

Further, the public values and the secret values are linked by a one-way associative function, that is, each public value may be found from the secret value, but the inverse is not true (knowing all the public values does not enable to calculate the set of corresponding secret values or any subset of the secret values). Such a one-way function is, for example, a cryptographic hash function, for example, of SHA-2 or SHA-3 type, or a ciphering function (for example, the AES) applied to a constant (for example, zero) and having as a key the secret value and as a result the public value.

Finally, the set of private values may be generated from one or a plurality of seeds by a derivation function, which is also a one-way function. The seeds may be different from one another or all the seeds may be identical (a single seed). In other words, all the secret values may be calculated from a derivation function using a same seed and an index of the secret value (there are as many indexes or identifiers as there are secret values). Further, a plurality of different seeds may each generate or derive the set of secret values. Various usual functions of derivation of secret values from seeds may be used (in the case of a plurality of seeds, a "surjective" cryptographic function capable of generating a same output value for different input values is preferably used).

Figure 3:
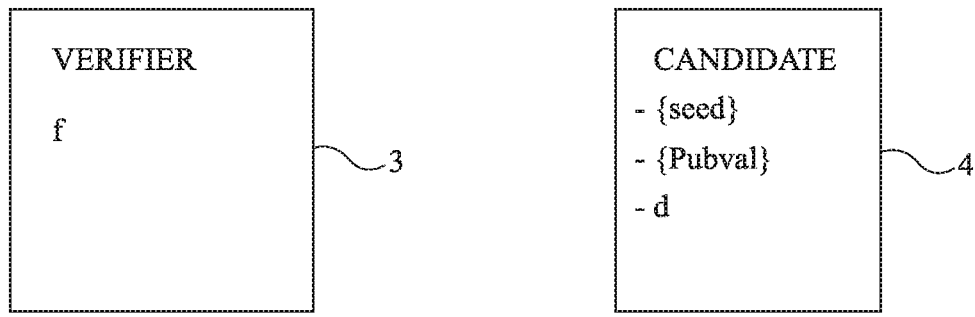
FIG. 3 schematically illustrates the respective contents of a verifier circuit and of a candidate circuit.

FIG. 3 schematically illustrates the respective contents of a verifier circuit and of a candidate circuit.

Circuits 3 and 4 are electronic circuits of the type of that is illustrated in FIG. 2.

A feature of circuit 4 is that, in addition to the volatile and non-volatile memories (to store the temporary date and the data such as programs and immovable data), it comprises a non-volatile once-only read or destructive readout memory, that is, where the reading of data erases the data.

Circuits 3 and 4 may contain various programs and data, but only the information and data for the implementation of the described authentication mechanism are here considered.

The (each) circuit 3 (VERIFIER) contains and is capable of executing a one-way function f matching a private value and a public value, that is, it preferably contains neither the set {PubVal} of n public values, nor the set {SecVal} of n secret values, but only a function f enabling, from a secret value SecVal(i), recovery of the public value PubVal(i) to which the secret value is associated. Function f is, for example, stored in circuit 3 during its customization. As a variation, function f enables recovery of index i from secret value SecVal(i).

The (each) circuit 4 contains (receives or determines on customization of the circuits) the set {PubVal} of the n public values PubVal(i), a set {Seed} of m seeds Seed(j) (with j ranging from 1 to m), and function d of derivation of a secret value SecVal(i) from a seed Seed(j) and from index i of the secret value.

The set of secret values {SecVal} and the set of public values {PubVal} are selected by the manufacturer or by the customizer of the circuits (generally, the manufacturer of the devices and of the products). Similarly, the set of seeds {Seed} is determined by the manufacturer or by the customizer of the circuits.

The set of secret values {SecVal} is loaded neither into the verifier circuit, nor into the candidate circuit. Preferably, the set {PubVal} of public values is not loaded (on customization of the circuits) into verifier circuit 3 but is loaded into candidate circuit 4. The set {Seed} of m seeds is only loaded (or randomly generated) into candidate circuit 4. Number m of seeds in circuit 4 is smaller (for example, by a ratio in the range from 2 to 10) than number n of public values and of private values of the system. In the case of a random generation of seeds by circuit 4, it is provided that, on customization of circuit 4, the latter communicates to the manufacturer of the devices the public values generated from the seeds.

As a variation, verifier circuit 3 contains, in a non-volatile memory, the set {PubVal} of public values. However, in no case should it contain the set {SecVal} of secret values. According to this variation, it is possible for candidate circuit 4 not to contain the set {PubVal} of public values.

Figure 4:
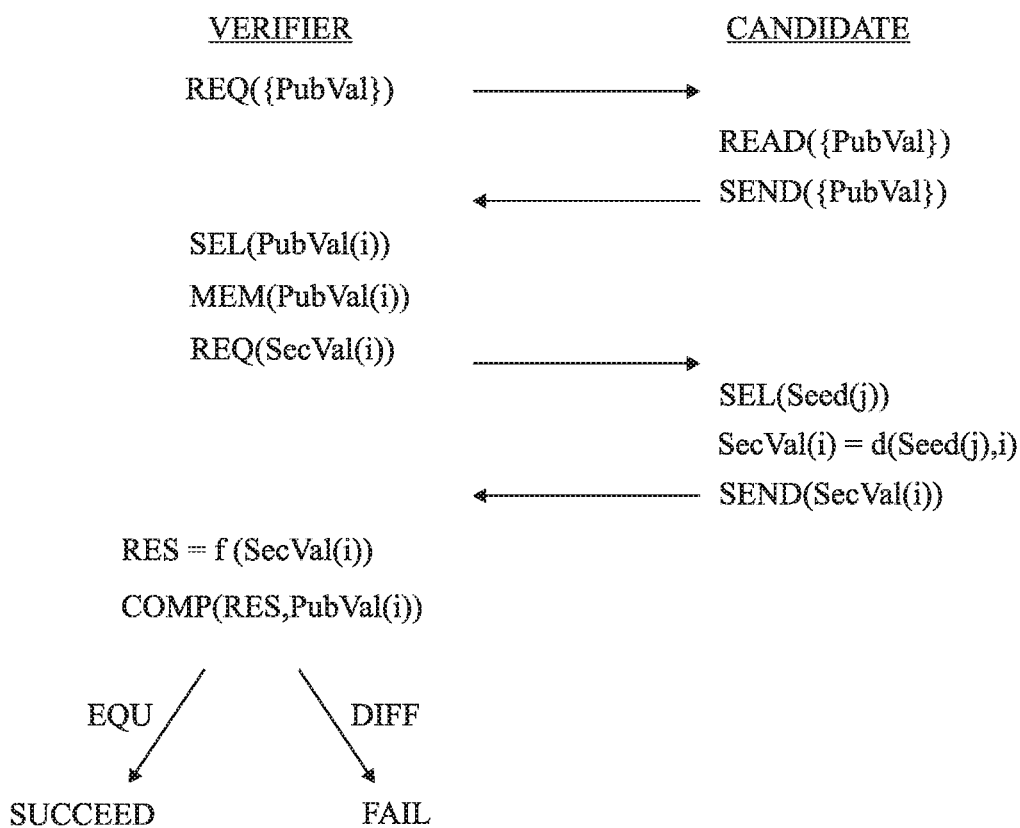
FIG. 4 schematically shows an embodiment of a method of authentication of a candidate circuit by a verifier circuit.

FIG. 4 schematically shows an embodiment of a method of authentication of a candidate circuit by a verifier circuit.

When verifier circuit 3 desires to verify the authenticity of candidate circuit 4, it sends thereto a request (REQ({PubVal})) for the set of public values.

Circuit 4 extracts (READ({PubVal})) from its non-volatile memory the set {PubVal} of the n public values and sends them (SEND({PubVal})) to circuit 3.

Circuit 3 selects (SEL(PubVal(i))), for example, randomly, one (PubVal(i)) of the public values and stores (MEM(PubVal(i))) at least this public value. Such a storage is preferably performed in a non-volatile memory.

Circuit 3 may store the n public values {PubVal} in its non-volatile memory to be able to use them again and spare the first two steps for subsequent authentications.

However, according to a preferred embodiment, set {PubVal} is extracted from a circuit 4, at least each time a new product (a new battery or a spare battery) is introduced, to make the system compatible with new families of products for which function f is still adapted but for which the sets of public values {PubVal} and of secret values {SecVal} are different. The fact of transferring the set of public values {PubVal} from circuit 4 to circuit 3, for each authentication, has the advantage of making the system compatible with the association, with a same device or circuit 3, of a plurality of products or circuits 4 having sets of public values {PubVal} and of secret values {SecVal} different from one circuit to another.

Once it has selected a public value PubVal(i), circuit 3 sends to circuit 4 a request (REQ(SecVal(i))) for the corresponding secret value SecVal(i). The request contains at least index i. As a variation, the request contains the actual public value. What matters is for circuit 4 to be able to determine index i of the secret value requested by circuit 3.

Circuit 4 then selects (SEL(Seed(j))), for example, randomly or sequentially from one authentication to another, a seed Seed(j) from set {Seed}. Once selected, the Seed(j) is read from the memory and its storage in the memory is destroyed (i.e., erase after the read).

With this seed and the index i communicated by circuit 3, circuit 4 generates or derives (SecVal(i)=d(Seed(j), i)) secret value SecVal(i).

This value is sent (SEND(SecVal(i))) to circuit 3 which applies (RES=f(SecVal(i))) function f thereto to obtain a value RES. Value RES is then compared (COMP(RES, PubVal(i))) with the public value PubVal(i) previously stored by circuit 3.

In the variation where function f enables recovery of index i from secret value SecVal(i), circuit 3 may simply store the index i that it selects without storing public value PubVal(i).

If the two values are not equal (DIFF), this means that circuit 4 is not authentic and the authentication fails (FAIL). If the values are equal (EQU), the authenticity is confirmed (SUCCEED).

The consequences of a successful or failed authentication are not modified by the described embodiments. It may be a blocking of device 1 and/or of product 2, a powering off of the device, etc. The described embodiments are compatible with any usual countermeasure.

An advantage of the described embodiments is that, even in case of an attack enabling discovery of the m secret values generated by a circuit 4, the manufactured clone circuits will not be functional since they will not contain the n secret values, but only part thereof. It can thus be seen that the discovery, by an attacker, of the secret values used by a given product is not prevented, but the attacker prevented from creating functional clone circuits.

In particular, it could be devised not to constrain (limit) the generation of secret values by circuit 4, but to count the number of secret values transmitted to circuit 3 and to limit this number to a threshold smaller than number n. However, if an attacker can prevent the updating of the counter, for example, by fault injection, the attacker will be able to restore the set of n secret values and thus to store it in the clone circuits to allow their authentication by a circuit 3 (which requires a secret value from this set).

It may also be devised to non-volatilely store the set of n secret values in circuit 4 on a customization thereof. However, this would not prevent an attacker from cloning the non-volatile memory and from thus obtaining the set of n secret values.

The use of a destructive readout non-volatile memory, combined with a lack of storage of all the secret values, with the use of a derivation from seeds, enables ensuring that no authentic circuit generates the full set of secret values, even in the case of successful attacks.

According to an alternative embodiment, circuit 4, although it erases the seeds as they are being used, stores in the non-volatile memory the secret values that it generates from the seeds. Thus, circuit 4 stores at most m secret values from among the n values of set {SecVal}. This enables using these values again when circuit 3 requests again a secret value which has already been generated. Thus, the number of authentications is not limited to m, but may be larger. This may, for example, be used to generate and store a subset of m public values on the side of circuit 3 and a subset of m corresponding public values on the side of circuit 4, and to use them again. Thus, the number of authentications is not limited, without generating the set of secret values for all m public values, and thus without adversely affecting the advantage that a clone circuit cannot operate since it will not be able to know or generate the m secret values. According to this variation, each generated secret value is stored in the non-volatile memory of circuit 4, for example, before it is sent to circuit 3. Further, a test is preferably added, on the side of circuit 4, before the extraction of a new seed, to verify that the requested secret value is not already present in its non-volatile memory. Thus, the size of the subset of generated secret values is not decreased.

The embodiment of FIG. 4 is a simplified embodiment to discuss the principles of the performed authentication. The calculations and exchanges may come along with any protection measure, for example, a symmetrical or asymmetrical ciphering of transmissions between circuits 3 and 4, an authentication by signature of the transmissions, etc. Further, the order of steps (MEM(PubVal(i))) and (REQ(SecVal(i)))) may be inverted or these steps may be carried out in parallel.

As a specific embodiment, the number of public and secret values is in the order of several tens or several hundreds and number m of seeds is in the order of some ten or of a few tens, provided that it remains smaller than number n.

Various embodiments have been described. Various modifications will occur to those skilled in the art. In particular, although reference has been made to an authentication of battery by a telephone, an inverse authentication is also possible. Further, the practical implementation of the embodiments which have been described is within the abilities of those skilled in the art, using the functional indications given hereabove.

Such alterations, modifications, and improvements are intended to be part of this disclosure, and are intended to be within the spirit and the scope of the present invention. Accordingly, the foregoing description is by way of example only and is not intended to be limiting.

The invention claimed is:

1. An authentication system, comprising:
   a verifier circuit having a one-way function stored therein that matches a private value to a public value, but not having a set of private values stored therein; and
   a candidate circuit having stored therein a set of public values, a set of seeds smaller in number than the set of public values, and a function for deriving a secret value from a public value using a seed of the set of seeds, but not having the set of private values stored therein, the candidate circuit including a destructive readout non-volatile memory for storage of the set of seeds, said destructive readout non-volatile memory permitting readout of each seed of the set of seeds only one time by erasing each seed from storage in response to read out of that seed from the destructive readout non-volatile memory;
   wherein the verifier circuit is configured to select one of the set of public values and to send a request to the candidate circuit for a secret value corresponding to the selected one of the set of public values;
   wherein the candidate circuit is configured to receive the request for the secret value corresponding to the selected one of the set of public values, to derive the secret value from the selected one of the set of public values using a seed from the set of seeds, and to send the secret value to the verifier circuit; and
   wherein the verifier circuit is configured to receive the secret value, to determine whether the received secret value matches the selected one of the set of public values using the one-way function, and to authenticate the candidate circuit based upon the determination.

2. The authentication system of claim 1, wherein the verifier circuit randomly selects the selected one of the set of public values.

3. The authentication system of claim 1, wherein the verifier circuit sequentially selects the selected one of the set of public values.

4. The authentication system of claim 1, wherein the candidate circuit is configured to send the set of public values to the verifier circuit prior to selection of one of the set of public values by the verifier circuit.

5. The authentication system of claim 1, wherein the verifier circuit sends the request to the candidate circuit for the secret value corresponding to the selected one of the set of public values by sending an index value corresponding to the selected one of the set of public values.

6. The authentication system of claim 5, wherein the candidate circuit derives the secret value from the index value of the selected one of the set of public values using the seed from the set of seeds.

7. The authentication system of claim 1, wherein the verifier circuit sends the request to the candidate circuit for the secret value corresponding to the selected one of the set of public values by sending the selected one of the set of public values.

8. The authentication system of claim 1, wherein the candidate circuit is configured to send an index for the set of public values to the verifier circuit prior to selection of one of the set of public values by the verifier circuit, the selection of one of the set of public values by the verifier circuit being performed by selecting a value in the index.

9. The authentication system of claim 1, wherein the candidate circuit is configured to store each derived secret value.

10. A method, comprising:
   selecting one of a set of public values and sending a request for a secret value corresponding to the selected one of the set of public values;
   deriving the secret value from the selected one of the set of public values using a seed from a set of seeds that is stored in a destructive fashion such that in response to read out of a seed from storage the read out seed is destroyed, the set of seeds being smaller in number than the set of public values; and
   determining whether the secret value matches the selected one of the set of public values using a one-way function, and generating a positive authentication based upon the determination of a match.

11. The method of claim 10, wherein the selected one of the set of public values is randomly selected.

12. The method of claim 10, wherein the selected one of the set of public values is sequentially selected.

13. The method of claim 10, wherein the request for the secret value corresponding to the selected one of the set of public values is sent by sending an index value corresponding to the selected one of the set of public values.

14. The method of claim 13, wherein the secret value is derived from the index value of the selected one of the set of public values using the seed of the set of seeds.

15. The method of claim 10, wherein the request for the secret value corresponding to the selected one of the set of public values is sent by sending the selected one of the set of public values.

16. The method of claim 10, wherein the selection of one of the set of public values is performed by selecting a value in an index corresponding to the set of public values.

17. The method of claim 10, wherein the set of seeds is smaller in number than the set of public values.

* * * * *